United States Patent
Mendonça Vilela Pinto Ferreira et al.

(10) Patent No.: US 10,772,454 B2
(45) Date of Patent: Sep. 15, 2020

(54) COOKING SYSTEM (71) Applicant: Mellow Inc., Walnut, CA (US)

(72) Inventors: José Guilherme Mendonça Vilela Pinto Ferreira, Lisbon (PT); Ana Catarina Violante Vieira, Óbidos (PT)

(73) Assignee: New Mellow Co, Miami Beach, FL (US)

( * ) Notice: Subject to any disclaimer, the term of this patent is extended or adjusted under 35 U.S.C. 154(b) by 48 days.

(21) Appl. No.: 15/303,025

(22) PCT Filed: Apr. 9, 2015

(86) PCT No.: PCT/EP2015/025016
§ 371 (c)(1),
(2) Date: Oct. 10, 2016

(87) PCT Pub. No.: WO2015/154885
PCT Pub. Date: Oct. 15, 2015

(65) Prior Publication Data
US 2017/0027365 A1 Feb. 2, 2017

(30) Foreign Application Priority Data
Apr. 9, 2014 (GB) .................................. 1406430.7

(51) Int. Cl.
*A47J 27/10* (2006.01)
*A47J 27/00* (2006.01)
(Continued)

(52) U.S. Cl.
CPC ............. *A47J 27/10* (2013.01); *A47J 27/004* (2013.01); *A47J 36/24* (2013.01); *A47J 36/321* (2018.08)

(58) Field of Classification Search
CPC ........... A47J 27/004; A47J 27/10; A47J 36/24
(Continued)

(56) References Cited

U.S. PATENT DOCUMENTS 3,769,028 A   10/1973   Riley et al.
5,281,426 A *   1/1994   Pardo ........................ A23L 3/10
                                                      426/232
(Continued)

FOREIGN PATENT DOCUMENTS

EP    2363048 A1   9/2011
GB    2525011 B    6/2016
(Continued)

OTHER PUBLICATIONS

Combined Search and Examination Report received for United Kingdom Patent Application No. GB1406430.7, dated Sep. 19, 2014, 6 pages.
(Continued)

*Primary Examiner* — Ibrahime A Abraham
*Assistant Examiner* — Frederick F Calvetti (57) ABSTRACT

A cooking system includes a cooking chamber, a supportive base, a cooling module, a heating module, a temperature sensor, a cooking control module and a flexible vessel. The cooling module is thermally coupled with the cooking chamber to reduce temperature in one or more regions thereof, while the heating module is thermally coupled with the cooking chamber to increase temperature in one or more regions thereof. Moreover, the temperature sensor is thermally coupled with the cooking chamber to measure temperature in one or more regions thereof. The cooking control module is arranged to adjust temperature of the cooking chamber through the cooling module and the heating module. Moreover, the flexible vessel includes an opening, and is sized and dimensioned to fit within the cooking chamber. The flexible vessel is constructed from a material impervious to liquids.

11 Claims, 8 Drawing Sheets

(51) Int. Cl.
*A47J 36/32* (2006.01)
*A47J 36/24* (2006.01)

(58) Field of Classification Search
USPC ........ 99/357, 484, 339, 340, 403, 407, 476, 99/474, 330
See application file for complete search history.

(56) References Cited

U.S. PATENT DOCUMENTS

| | | | |
|---|---|---|---|
| 5,363,746 A * | 11/1994 | Gordon | A23G 9/12 366/145 |
| 6,730,890 B2 * | 5/2004 | Kish | H05B 6/6441 219/413 |
| 6,832,487 B1 | 12/2004 | Baker | |
| 7,594,582 B2 | 9/2009 | Sus et al. | |
| 7,707,931 B2 | 5/2010 | Garrett et al. | |
| 7,757,601 B2 | 7/2010 | Corominas et al. | |
| 7,891,289 B2 * | 2/2011 | Day | B65B 43/305 99/330 |
| 8,268,376 B2 | 9/2012 | Sus et al. | |
| 9,603,477 B2 * | 3/2017 | Hoare | A47J 27/10 |
| 9,839,230 B2 * | 12/2017 | Neff | A23L 5/13 |
| 2007/0253647 A1 | 11/2007 | Sus et al. | |
| 2008/0066624 A1 | 3/2008 | Taylor et al. | |
| 2008/0121636 A1 * | 5/2008 | Hallgren | H05B 6/6435 219/708 |
| 2010/0034935 A1 | 2/2010 | Wally et al. | |
| 2011/0185915 A1 | 8/2011 | Eades et al. | |
| 2012/0037898 A1 * | 2/2012 | Wu | C07D 209/86 257/40 |
| 2012/0137898 A1 * | 6/2012 | Alipour | A47J 27/04 99/483 |
| 2012/0251695 A1 * | 10/2012 | Neff | A47J 27/004 426/509 |
| 2013/0112683 A1 * | 5/2013 | Hegedis | A47J 36/321 219/660 |
| 2013/0220143 A1 | 8/2013 | Fetterman et al. | |
| 2013/0240500 A1 * | 9/2013 | Alipour | A47J 27/18 219/438 |
| 2013/0264333 A1 | 10/2013 | Alipour et al. | |
| 2014/0091083 A1 * | 4/2014 | McGarvey | A47J 27/004 219/634 |
| 2014/0122520 A1 * | 5/2014 | Jung | G06F 16/2455 707/769 |
| 2015/0257573 A1 * | 9/2015 | Gabara | A47J 27/10 99/337 |
| 2015/0257574 A1 * | 9/2015 | Hoare | A47J 27/10 99/342 |
| 2015/0272371 A1 * | 10/2015 | Gagnon | A47J 27/10 426/231 |
| 2015/0289544 A1 | 10/2015 | Ferreira et al. | |
| 2015/0342389 A1 * | 12/2015 | Wu | A47J 27/10 700/30 |
| 2016/0066739 A1 * | 3/2016 | Fetterman | A47J 36/2405 99/330 |
| 2016/0081372 A1 * | 3/2016 | Pinto Ferreira | A47J 27/04 426/231 |
| 2016/0192802 A1 * | 7/2016 | Alipour | A47J 27/004 383/37 |
| 2016/0324359 A1 * | 11/2016 | Aboujassoum | A47J 36/00 |
| 2017/0098187 A1 * | 4/2017 | Jung | G06Q 10/0832 |
| 2017/0347824 A1 * | 12/2017 | Alipour | A47J 27/10 |
| 2018/0199749 A9 * | 7/2018 | Wu | A47J 27/10 |
| 2019/0038063 A1 * | 2/2019 | Godfroid | A47J 27/10 |

FOREIGN PATENT DOCUMENTS

| | | |
|---|---|---|
| WO | 2014/019018 A1 | 2/2014 |
| WO | WO2014019018 * | 2/2014 |
| WO | 2015/154885 A2 | 10/2015 |

OTHER PUBLICATIONS

Examination Report received for United Kingdom Patent Application No. GB1406430.7, dated Jun. 17, 2015, 2 pages.
International Search Report and Written Opinion received for International Patent Application No. PCT/EP2015/025016, dated Dec. 11, 2015, 16 pages.
International Preliminary Report on Patentability issued in International PCT Application No. PCT/EP2015/025016 dated Oct. 12, 2016, 10 pages.
Communication Pursuant to Article 94(3) EPC issued in EP Application No. EP15722074.0 dated Jun. 24, 2019, 7 pages.

* cited by examiner

COOKING SYSTEM

TECHNICAL FIELD

The present disclosure relates generally to cooking and, more particularly, to "sous-vide" cooking as well to devices and systems suitable therefore.

BACKGROUND

Cooking and enjoying food are popular pastimes. In both domestic and professional settings, "sous-vide" cooking is becoming increasingly common. In "sous-vide" cooking, food is cooked for relatively longer times at relatively lower temperatures, and is generally separated from a cooking medium by packaging in airtight plastic bags. The cooking medium is usually a temperature-controlled water bath or steam oven, which allows for rapid heat transfer between the packaged food and the cooking medium.

In general, "sous-vide" cooking requires that cooking temperatures and durations be controlled precisely to obtain a desired end result—a palatable cooked food that is safe from food-borne bacteria. A difference of only one degree Centigrade (1° C.) in the cooking temperature can have a large effect in the end result. A need for an improved cooking system that makes "sous-vide" cooking easier.

SUMMARY

In one aspect, embodiments of the present disclosure provide a cooking system including a cooking chamber, a supportive base, a cooling module, a heating module, a temperature sensor, a cooking control module and a flexible vessel.

The supportive base is constructed to removably receive the cooking chamber.

The cooling module is thermally coupled with the cooking chamber to selectively reduce temperature in one or more regions of the cooking chamber, while the heating module is thermally coupled with the cooking chamber to selectively increase temperature in one or more regions of the cooking chamber.

Moreover, the temperature sensor is thermally coupled with the cooking chamber to measure temperature in one or more regions of the cooking chamber.

The cooking control module is arranged to adjust temperature of the one or more regions of the cooking chamber through the cooling module and the heating module.

Moreover, the cooking system further includes a one-way valve in fluid communication with the cooking chamber, and an air pump configured to supply air through the one-way valve to the cooking chamber. The cooking control module is arranged to adjust fluid flow in the cooking chamber through the one-way valve and the air pump.

Furthermore, the flexible vessel includes an opening, and is sized and dimensioned to fit within the cooking chamber. The flexible vessel is constructed from a material impervious to liquids.

Optionally, the cooking system further includes a heat sink thermally coupled with the cooling module opposite the cooking chamber to dissipate heat from the cooling module.

Optionally, the heating module is a resistance heater.

Optionally, the cooking control module is programmed to activate the heating module when a desired temperature is greater than both an ambient temperature and a temperature measured by the temperature sensor.

Optionally, the cooking control module is programmed to activate the cooling module when a desired temperature is less than both an ambient temperature and a temperature measured by the temperature sensor.

Optionally, the cooking control module is programmed to activate the heating module in accordance with signals received from a remote client interface.

Optionally, the cooking control module is programmed to activate the cooling module in accordance with signals received from a remote client interface.

Optionally, the cooking control module is programmed to activate the air pump in accordance with signals received from a remote client interface.

Optionally, the cooking system further includes a plurality of load cells coupled with the cooking control module, wherein the cooking control module is programmed to send signals to a remote client interface in response to detection of changes in mass and/or force by the plurality of load cells.

Optionally, the flexible vessel includes a weight distribution maintaining the opening above a remainder of the flexible vessel when partially or wholly submerged.

Optionally, the flexible vessel comprises a zipper closure provided to selectively seal the opening.

Optionally, the flexible vessel comprises a one-way valve to seal the opening.

Optionally, the flexible vessel takes a form of a cooking subject held therein in response to sufficient exterior hydrostatic pressure.

Optionally, the cooking system further includes one or more fans arranged to circulate air over one or more of: the heating module, the cooling module, the air pump.

In another aspect, embodiments of the present disclosure provide a cooking system including a cooking chamber, a supportive base, a cooling module, a heating module, a temperature sensor, a cooking control module and a scale.

The cooling module is thermally coupled with the cooking chamber to reduce temperature in one or more regions of the cooking chamber, while the heating module is thermally coupled with the cooking chamber to increase temperature in one or more regions of the cooking chamber.

Moreover, the temperature sensor is thermally coupled with the cooking chamber to measure temperature in one or more regions of the cooking chamber.

The cooking control module is arranged to adjust temperature of the one or more regions of the cooking chamber through the cooling module and the heating module.

Moreover, the scale is coupled with the cooking control module to detect changes in mass and/or force exerted on the cooking chamber.

Optionally, the cooking system further includes a network interface coupled with the cooking control module and configured for communication through a communication network and a server formulated to provide cooking services, through the communication network and the network interface, to the cooking control module and a remote client interface.

Optionally, the cooking system further includes a cooking services database configured to provide, to the server, a variety of information and instructions employable to set a cooking chamber circulation and temperature using the cooking control module.

Optionally, the server further includes a computer program product stored on a non-transitory computer-readable storage medium and including instructions, which, when executed by a processor, cause the server to send a cooking control routine to the cooking control module in accordance with information contained in the cooking services database.

Optionally, the server further includes a computer program product stored on a non-transitory computer-readable storage medium and including instructions, which, when executed by a processor, cause the server to send a cooking control routine to the cooking control module in accordance with an input from the remote client interface.

Optionally, the server further includes a computer program product stored on a non-transitory computer-readable storage medium and including instructions, which, when executed by a processor, cause the server to send a notification to the remote client interface in accordance with a change in mass and/or force detected by the scale.

In another aspect, embodiments of the present disclosure provide a cooking system including a cooking chamber, a supportive base constructed to removably receive the cooking chamber, a cooling module thermally coupled with the cooking chamber to selectively reduce temperature of a fluid held therein, a heating module thermally coupled with the cooking chamber to selectively reduce temperature of a fluid held therein, a temperature sensor thermally coupled with the cooking chamber to measure temperature of a fluid held therein. The cooking chamber, the cooling module, the heating module and the temperature sensor are configured such that a cooking subject may be heated or cooled without being removed from the cooking chamber. The cooking system also includes a flexible vessel having an opening, the flexible vessel being sized and dimensioned to fit within the cooking chamber and constructed from a material impervious to liquids as well as a cooking control module arranged to adjust temperature of a fluid held in the cooking chamber through the cooling module and the heating module such the flexible vessel, when held in the cooking chamber, is heated and cooled without being removed from the cooking chamber.

In yet another aspect, embodiments of the present disclosure provide a cooking system, including a cooling module, a heating module, a temperature sensor, a cooking chamber thermally coupled with the cooling module, the heating module and the temperature sensor, wherein coupling of the cooking chamber with the cooling module is provided, in part, by gravity. Also included is a supportive base constructed to removably receive the cooking chamber, a one-way valve in fluid communication with the cooking chamber, an air pump configured to supply air through the one-way valve to the cooking chamber, a cooking control module arranged to adjust fluid flow through the one-way valve, and to adjust temperature of a fluid held in the cooking chamber through the cooling module and the heating module and a flexible vessel including an opening, the flexible vessel being sized and dimensioned to fit within the cooking chamber and constructed from a material impervious to liquids.

In yet another aspect, embodiments of the present disclosure provide a cooking system, including a cooking chamber, a supportive base constructed to removably receive the cooking chamber, a cooling module thermally coupled with the cooking chamber to selectively reduce temperature of a fluid held therein, a heating module thermally coupled with the cooking chamber to selectively increase temperature of a fluid held therein, a temperature sensor thermally coupled with the cooking chamber to measure temperature of a fluid held therein and an air injection module configured to aerate and mix fluid held in the cooking chamber. A cooking control module is arranged to adjust air flow through the air injection module, and to adjust temperature of a fluid held in the cooking chamber through the cooling module and the heating module. A flexible vessel has an opening, is sized and dimensioned to fit within the cooking chamber and is constructed from a material impervious to liquids.

Optionally, the air injection module further includes a one-way valve in fluid communication with the cooking chamber and an air pump configured to supply air through the one-way valve to the cooking chamber.

DESCRIPTION OF THE DRAWINGS

The disclosure is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although the best mode of carrying out the present embodiments has been disclosed, those skilled in the art would recognize that other embodiments for carrying out or practicing the present disclosure are also possible. It will be appreciated that features presently disclosed are susceptible to being combined in various arrangements without departing from the scope of the present disclosure as defined by the appended claims.

It should be noted that the terms "first", "second", and the like, herein do not denote any order, quantity, or importance, but rather are used to distinguish one element from another. Further, the terms "a" and "an" herein do not denote a limitation of quantity, but rather denote the presence of at least one of the referenced item.

Conventional cooking devices suffer from several disadvantages. For example, conventional cooking devices are complicated and difficult to operate which may lead to delays, errors and fears over food safety. Also, the water baths of conventional cooking devices are often large and requires a user pre-heat a large amount of water for cooking even a small amount of food. As a result, total preparation time for "sous-vide" cooking often extends to over an hour. Additionally, the user has to repeatedly check cooking time and cooking temperature combinations being used during "sous-vide" cooking making the "sous vide" cooking process cumbersome. Furthermore, conventional cooking devices use disposable plastic bags, which proliferates plastic waste.

Attempts to overcome these and other disadvantages of conventional "sous vide" cooking devices and systems have been unsatisfactory.

Embodiments of the present disclosure address problems of the prior art by, in part, providing a cooking system including a cooking chamber, a supportive base, a cooling module, a heating module, a temperature sensor, and a cooking control module.

The supportive base is constructed to removably receive the cooking chamber.

The cooling module is thermally coupled with the cooking chamber to selectively reduce temperature in one or more regions of the cooking chamber. The cooling module may be a thermoelectric cooler.

The heating module is thermally coupled with the cooking chamber to selectively increase temperature in one or more regions of the cooking chamber. The heating module may be a resistance heater.

Moreover, the temperature sensor is thermally coupled with the cooking chamber to measure temperature in one or more regions of the cooking chamber.

The cooking control module is arranged to adjust temperature of the one or more regions of the cooking chamber through the cooling module and the heating module. In this regard, the cooking control module may be programmed to activate the heating module when a desired temperature of the cooking chamber is greater than both an ambient temperature and a temperature measured by the temperature sensor. The cooking control module may also be programmed to activate the cooling module when the desired temperature is less than both the ambient temperature and the temperature measured by the temperature sensor.

Additionally, the cooking control module may be programmed to activate the heating module or the cooling module in accordance with signals received from a remote client interface.

Moreover, the cooking system may further include a one-way valve in fluid communication with the cooking chamber, and an air pump configured to supply air through the one-way valve to the cooking chamber.

The cooking control module may be arranged to adjust fluid flow in the cooking chamber through the one-way valve and the air pump. Additionally, the cooking control module may be programmed to activate the air pump in accordance with the signals received from the remote client interface.

Moreover, the cooking system may further include one or more fans arranged to circulate air over one or more of: the heating module, the cooling module, and/or the air pump.

Moreover, the cooking system may further include a scale coupled with the cooking control module to detect changes in mass of the cooking chamber and/or force exerted on the cooking chamber. In some embodiments, the scale is implemented as a plurality of load cells coupled with the cooking control module.

The cooking control module may be programmed to send signals to the remote client interface in response to detection of changes in mass and/or force by the plurality of load cells.

Furthermore, the cooking system may further include a network interface coupled with the cooking control module and configured for communication through a communication network.

Moreover, the cooking system may further include a server and a cooking services database. The server may be formulated to provide cooking services, through the communication network and the network interface, to the cooking control module and the remote client interface. The cooking services database may be configured to provide, to the server, a variety of information and instructions employable or executable to set a cooking chamber circulation and temperature using the cooking control module.

The server may include a computer program product stored on a non-transitory computer-readable storage medium and including instructions, which, when executed by a processor, cause the server to perform one or more of:

(i) sending a cooking control routine to the cooking control module in accordance with information contained in the cooking services database;

(ii) sending a cooking control routine to the cooking control module in accordance with an input from the remote client interface; and/or (iii) sending a notification to the remote client interface in accordance with a change in mass and/or force detected by the scale.

Furthermore, the cooking system is suitable for safe and easy "sous-vide" cooking.

Figure 1:
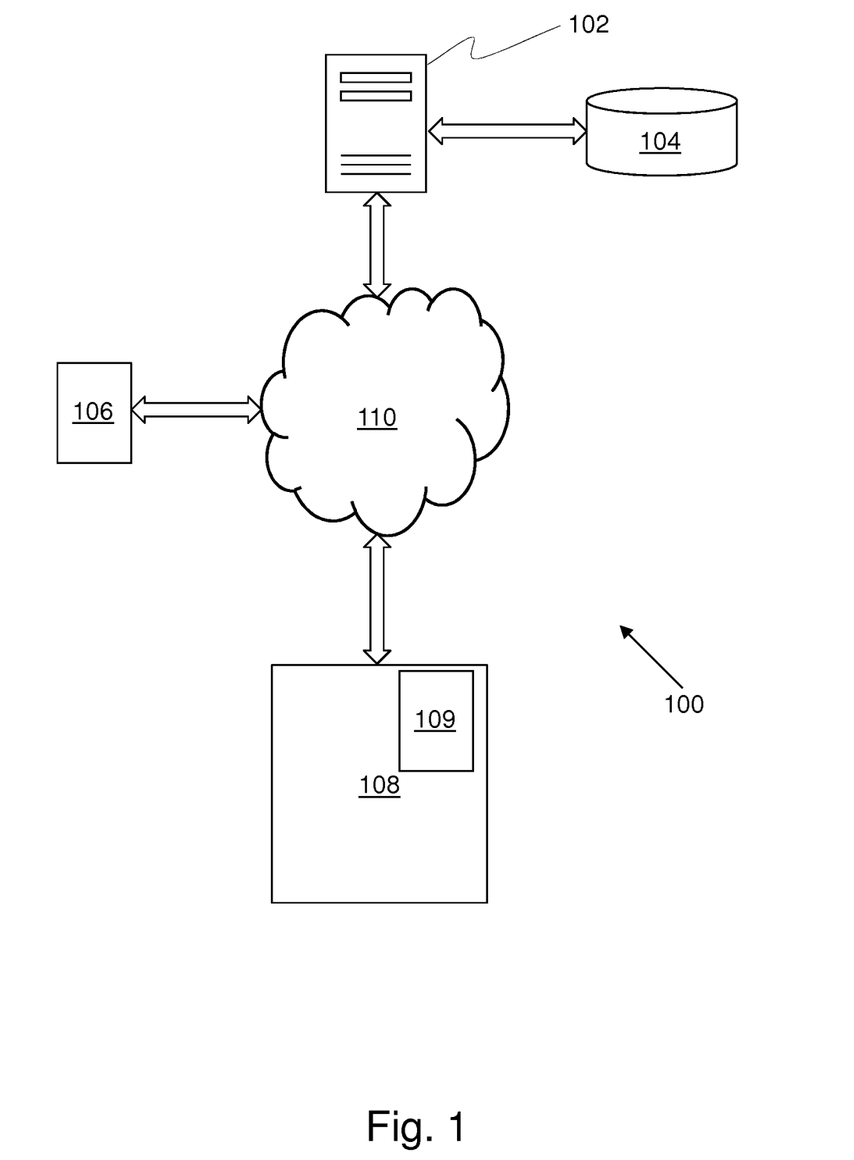
FIG. 1 is a schematic illustration of an example cooking system, in accordance with an embodiment of the present disclosure.

Referring now to the drawings, particularly by their reference numbers, FIG. 1 is a schematic illustration of a cooking system 100, in accordance with an embodiment of the present disclosure. The cooking system 100 includes a server 102, a cooking services database 104, a user device 106, and a cooking device 108. FIG. 1 shows one cooking device and one user device for illustration purposes only. It is to be noted here that the cooking system 100 can be implemented with any number of cooking devices and user devices.

The cooking system 100 may be implemented in various ways, depending on various possible scenarios. In one example, the cooking system 100 may be implemented by way of a spatially collocated arrangement of the server 102 and the cooking services database 104, as shown in FIG. 1. In another example, the cooking system 100 may be implemented by way of a spatially distributed arrangement of the server 102 and the cooking services database 104 coupled mutually in communication via a communication network. In yet another example, the server 102 and the cooking services database 104 may be implemented via cloud-based computing services.

The server 102 is operatively coupled to the user device 106 and the cooking device 108, via a communication network 110.

The communication network 110 can be a collection of individual networks, interconnected with each other and functioning as a single large network. Such individual networks may be wired, wireless, or a combination thereof. Examples of such individual networks include, but are not limited to, Local Area Networks (LANs), Wide Area Networks (WANs), Metropolitan Area Networks (MANs), Wireless LANs (WLANs), Wireless WANs (WWANs), Wireless MANs (WMANs), the Internet, second generation (2G) telecommunication networks, third generation (3G) telecommunication networks, fourth generation (4G) telecommunication networks, satellite-based telecommunication networks, and Worldwide Interoperability for Microwave Access (WiMAX) networks.

Moreover, the cooking device 108 includes a cooking control module (FIGS. 2B and 2C) and a network interface 109 coupled with the cooking control module. The network interface 109 is beneficially configured for communication through the communication network 110.

In order to access various services provided by the server 102 and/or control the cooking device 108, the user device 106 may employ a computer program product that provides a remote client interface to a user of the cooking device 108. The computer program product may be a native application, an application running on a browser, or a plug-in application provided by a website, such as a social networking website. Optionally, the remote client interface is beneficially implemented by way of an interactive Graphical User Interface (GUI).

The user device 106 may be implemented using a computing device that includes computing hardware operable to execute the aforementioned program product. Examples of such computing devices include, but are not limited to, mobile phones, smart telephones, Mobile Internet Devices (MIDs), tablet computers, Ultra-Mobile Personal Computers (UMPCs), phablet computers, Personal Digital Assistants (PDAs), web pads, Personal Computers (PCs), handheld PCs, laptop computers, desktop computers, large-sized touch screens with embedded PCs, and other interactive devices, such as Television (TV) sets and Set-Top Boxes (STBs).

Moreover, the server 102 may be formulated to provide cooking services, through the communication network 110 and the network interface 109, to the cooking control module and the remote client interface. The cooking services database 104 is configured to provide, to the server 102, a variety of information and instructions employable to set a cooking chamber circulation and temperature using the cooking control module.

Furthermore, the server 102 may include a computer program product stored on a non-transitory computer-readable storage medium and including instructions, which, when executed by a processor, cause the server 102 to perform one or more of:
(i) sending a cooking control routine to the cooking control module in accordance with information contained in the cooking services database 104;
(ii) sending a cooking control routine to the cooking control module in accordance with a user input from the remote client interface; and/or
(iii) sending a notification to the remote client interface in accordance with a change in mass and/or force detected in the cooking device 108.

The cooking system 100 beneficially allows the user to remotely control the cooking device 108. Additional details of the operation of cooking system 100 are been provided in conjunction with FIGS. 2A, 2B and 2C.

FIG. 1 is merely an example, which should not unduly limit the scope of the claims herein. It is to be understood that the specific designation for the cooking system 100 is provided as an example and is not to be construed as limiting the cooking system 100 to specific numbers, types, or arrangements of servers, cooking services databases, user devices, and cooking devices. A person skilled in the art will recognize many variations, alternatives, and modifications of embodiments of the present disclosure.

Figure 2A:
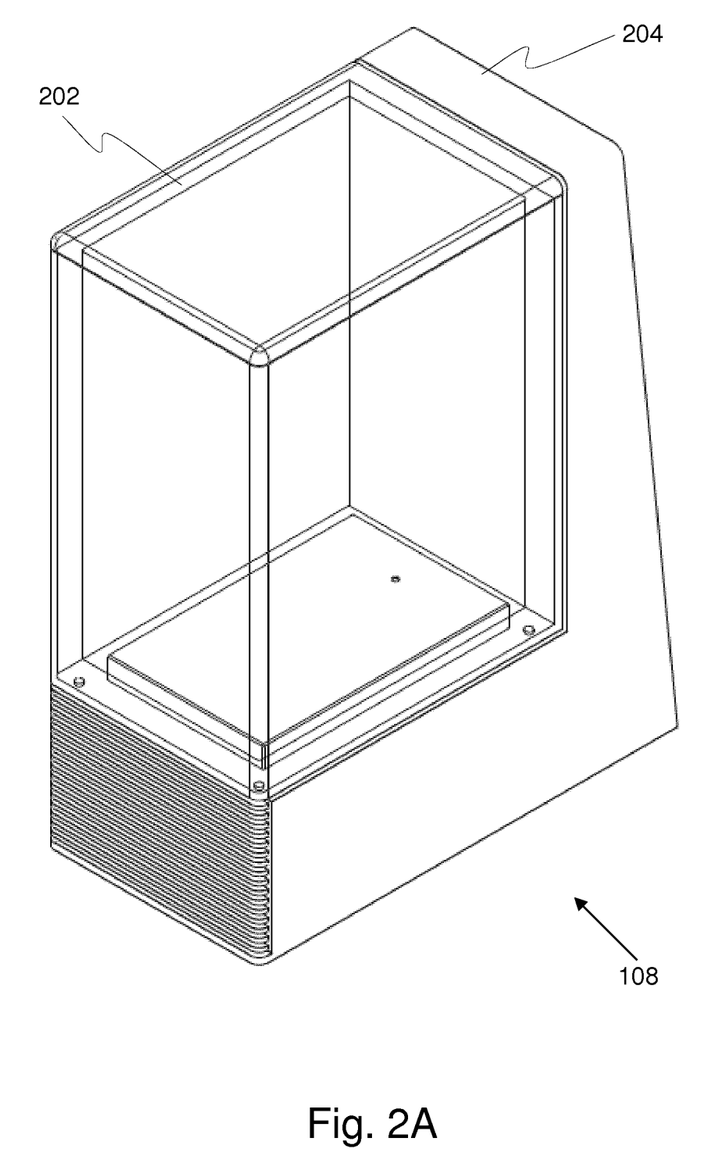
FIGS. 2A, 2B and 2C are schematic illustrations of an example cooking device, in accordance with an embodiment of the present disclosure.
Figure 2B:
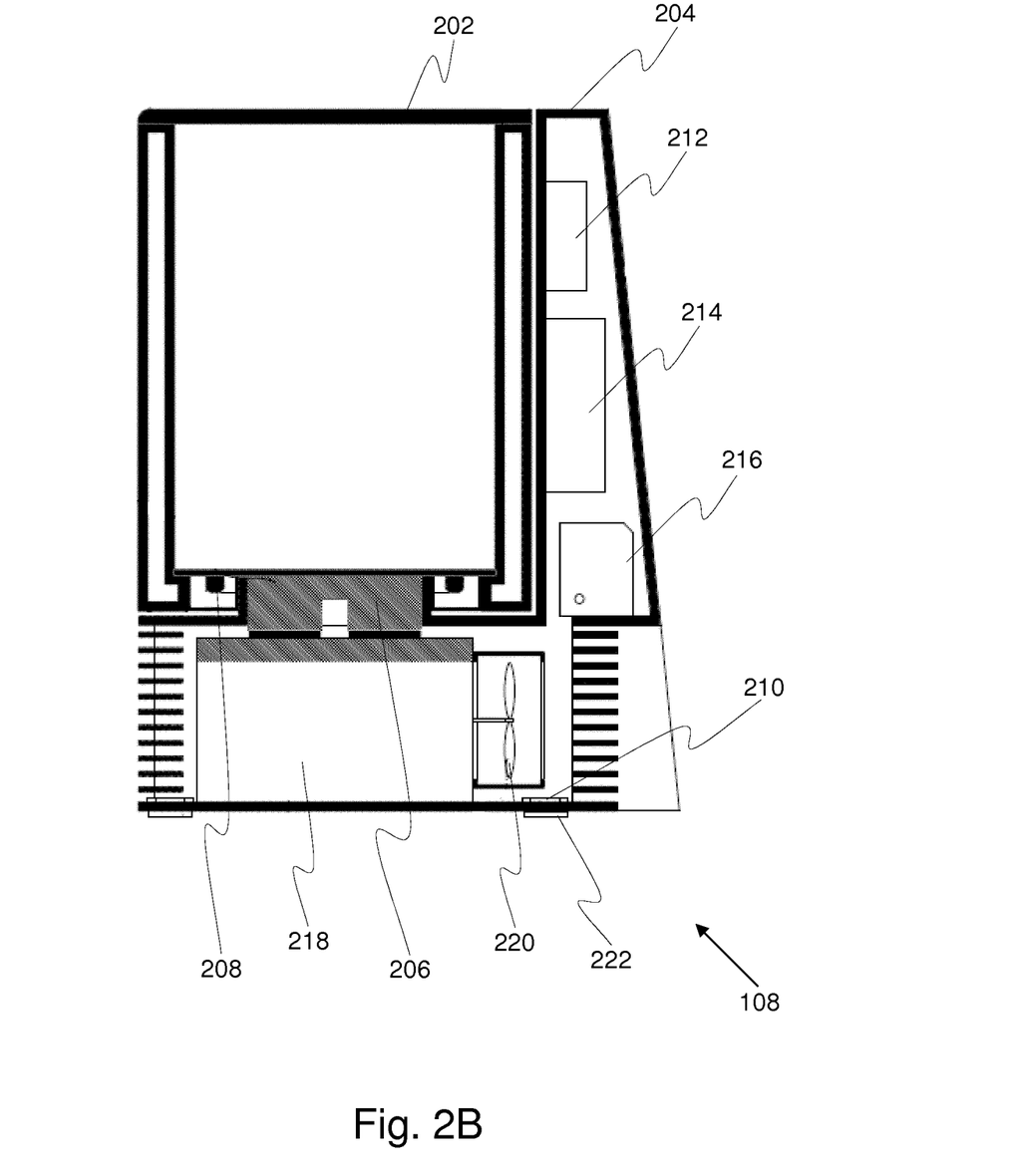
Figure 2C:
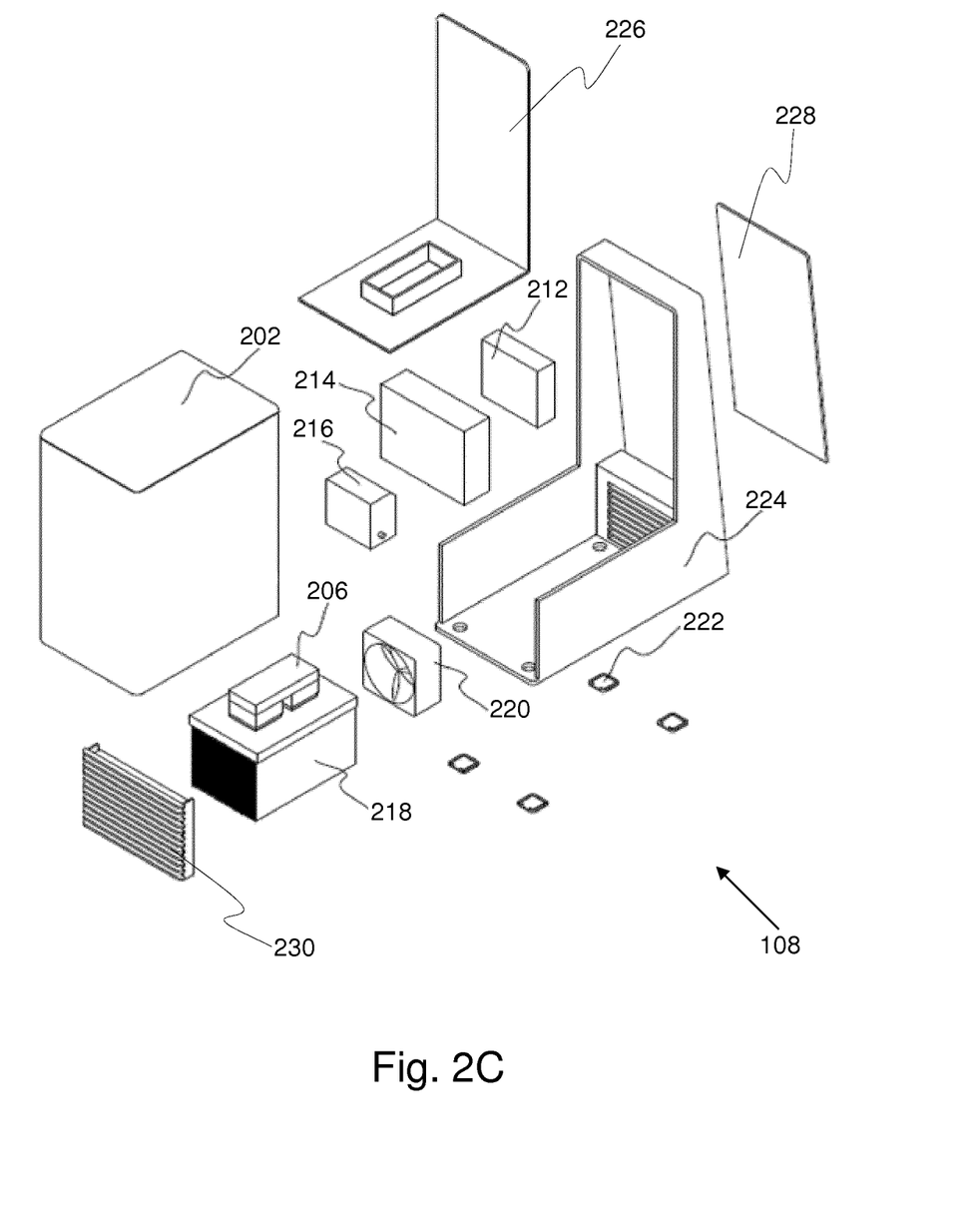

FIGS. 2A, 2B and 2C are schematic illustrations of the cooking device 108, in accordance with an embodiment of the present disclosure.

FIG. 2A shows an isometric view of the cooking device 108. The cooking device 108 includes a supportive base 204 and a cooking chamber 202 having side and bottom exterior surfaces. The supportive base 204 is constructed to removably receive the cooking chamber 202 which, in turn, is configured to receive and hold a cooking medium such as a cooking fluid therein. Cooking fluids appropriate for use in cooking with cooking device 108 and cooking chamber 202 include, for example, liquids such as water.

FIG. 2B shows a cross-sectional view of the cooking device 108. The cooking device 108 further includes a cooling module 206, a heating module 208, one or more temperature sensors (not shown), a scale 210, a cooking control module 212, and a power source 214. The cooking device 108 may additionally include an air injection module 216 having an air pump and a one-way valve (not shown). The cooking device 108 may further include a heat sink 218 arranged opposite the cooling module 206 from cooking chamber 202 and one or more fans 220 for convection of heat away from heat sink 218.

The cooling module 206 is thermally coupled with the cooking chamber 202 to selectively reduce temperature in one or more regions of the cooking chamber 202. In one example, with supportive base 204 in receipt of cooking chamber 202, the cooling module 206 supports cooking chamber 202 and directly contacts the bottom exterior surface thereof in order to conduct heat from cooking chamber 202 to heat sink 218, which then dissipates the heat to an ambient environment. A flush fit of the bottom exterior surface of cooking chamber 202 against cooling module 206 is facilitated by gravity pulling a filled cooking chamber down onto the cooling module 206 thus eliminating the need for fasteners such as screws.

The cooling module 206 may be implemented by way of a thermoelectric cooler in which semiconductors electrically in series and thermally in parallel are sandwiched between hot and cold plates with the cold plate in contact with cooking chamber 202 and the hot plate in contact with heat sink 218. Employing thermoelectric cooling enables the cooling module to be constructed without moving parts, enables the cooling module and, therefore the cooking device 108 to be small, and enables precise temperature control of cooking chamber 202 as well as the cooking fluid and any cooking subject surrounded thereby. In some embodiments, the cooling module 206 may be implemented by way of a compressor-based cooler rather than or in addition to a thermoelectric cooler.

The heating module 208 is thermally coupled with the cooking chamber 202 to selectively increase temperature in one or more regions of the cooking chamber 202 and may be implemented by way of a resistance heater.

Moreover, at least one of the temperature sensors is thermally coupled with the cooking chamber 202 to measure temperature in one or more regions of the cooking chamber 202 (hereinafter referred to as "chamber temperature").

Moreover, one or more of the temperature sensors may be arranged to measure an ambient temperature.

The cooking control module 212 is arranged to adjust temperature of a cooking fluid held in the cooking chamber 202 through the cooling module 206 and the heating module 208. In some examples, the cooking control module 212 is programmed to activate the heating module 208 when a desired temperature of the cooking chamber 202 (hereinafter referred to as "desired chamber temperature") is greater than the chamber temperature measured by one or more of the temperature sensors (hereinafter referred to as "measured chamber temperature"). In other examples, the cooking control module 212 is programmed to activate the heating module 208 when the desired chamber temperature is greater than both the ambient temperature and the measured chamber temperature. Due to direct application of heating and cooling to the single cooking chamber 202 any cooking fluid and cooking subject held within cooking chamber 202 may be heated and subsequently cooled, cooled and subsequently heated or alternately heated and cooled any number of times without the need to transfer the cooking fluid or the cooking subject to one or more additional chambers.

In an embodiment, walls of the cooking chamber 202 are multi-layered, so as to provide an insulation from the ambient environment. In this embodiment, the cooking control module 212 is programmed to activate the heating module 208 when the desired chamber temperature is greater than the measured chamber temperature.

Likewise, in some examples, the cooking control module 212 may be programmed to activate the cooling module 206 when the desired chamber temperature is less than the measured chamber temperature. In other examples, the cooking control module 212 is programmed to activate the cooling module 206 when the desired chamber temperature is less than both the ambient temperature and the measured chamber temperature.

Additionally, the cooking control module 212 may be programmed to activate the heating module 208 or the cooling module 206 in accordance with signals received from the remote client interface of the user device 106, via the network interface 109.

Moreover, the network interface 109 allows the cooking control module 212 to communicate with the server 102, via the communication network 110. The network interface 109 may be, for example, a wireless interface.

Moreover, the scale 210 may be arranged to detect changes in mass of the cooking chamber 202 and/or force exerted on the cooking device 108. Furthermore, the scale 210 may be configured to detect transient changes in mass and/or force which may occur, for example, when the user taps the cooking chamber 202.

The scale 210 is coupled with the cooking control module 212. The cooking control module 212 may be programmed to send signals to the remote client interface in response to detection of changes in mass and/or force. For this purpose, the cooking control module 212 may be programmed to send these signals to the server 102, which then sends one or more notifications to the remote client interface of the user device 106.

Signals sent by the cooking control module may include information about the changes in mass and/or force detected by the scale 210, for example, including amount and duration of the changes and/or whether the changes were transient or non-transient. The server 102 may be configured to analyze the signals to determine whether the changes pertain to one or more of: a mass of a cooking subject placed inside the cooking chamber 202, a mass of a liquid being poured into the cooking chamber 202, and/or a tapping gesture made by the user on the cooking device 108 for providing an input to the cooking system 100.

In an example, the cooking device 108 is configured such that that a predefined tapping gesture made by the user switches on the cooking device 108. Consequently, the cooking control module 212 sends a signal to the server 102, which then sends a push notification to the remote client interface of the user device 106. The predefined tapping gesture may be either user-defined or system-defined by default.

In an embodiment, the scale 210 is implemented by way of a plurality of load cells coupled with the cooking control module 212. The plurality of load cells are optionally mounted in a half-bridge configuration on feet 222 of the supportive base 204, as shown in FIG. 2B.

Moreover, the air pump may be configured to supply air through the one-way valve to the cooking chamber 202 to aerate and mix a cooking fluid held therein.

The cooking control module 212 may be arranged to adjust gas flow into the cooking chamber 202 through the air injection module 216. Additionally, the cooking control module 212 may be programmed to activate the air injection module 216 in accordance with the signals received from the remote client interface.

It is to be noted here that in one example implementation, the air pump may be replaced with a water pump or an impeller to produce a mechanical agitation within a liquid filled in the cooking chamber 202.

Moreover, the fan 220 may be arranged to circulate air over one or more of: the heating module 208, the cooling module 206, and/or the air injection module 216.

FIG. 2C shows an exploded view of the supportive base 204 and various components associated therewith. With reference to FIG. 2C, the supportive base 204 includes an outer frame that includes an L-shaped housing 224, an L-shaped plate 226, a back plate 228 and a front plate 230. The feet 222 are attached at a bottom side of the L-shaped housing 224.

As shown in FIG. 2C, the supportive base 204 holds electrical components, including the cooling module 206, the scale 210, the cooking control module 212, the power source 214, the air injection module 216, and the fan 220.

The power supply 214 may include a Direct Current (DC) power source for supplying electrical power to the heating module 208 and the air injection module 216. The power supply 214 may include an Alternating Current (AC) power source for supplying electrical power to the cooling module 206, the cooking control module 212 and the fan 220. In some examples, the power supply 214 employs an appropriate control loop, such as a pulse-width modulation, in order to control the electrical power supplied to the electrical components.

In order to provide an electrical insulation from the electrical components, one or more parts of the outer frame may be made of an electrically-insulating material, for example, such as plastic and polycarbonate. In order to provide strength to the supportive base 204, one or more parts of the outer frame may be made of a metal or a metal alloy, such as an Aluminium sheet. The feet 222 may be made of rubber.

Moreover, the cooking system 100 may further include a flexible vessel 500 (FIG. 5) sized and dimensioned to fit within the cooking chamber 202 and having an opening 502 enabling receipt of a cooking subject within vessel 500.

Figure 5:
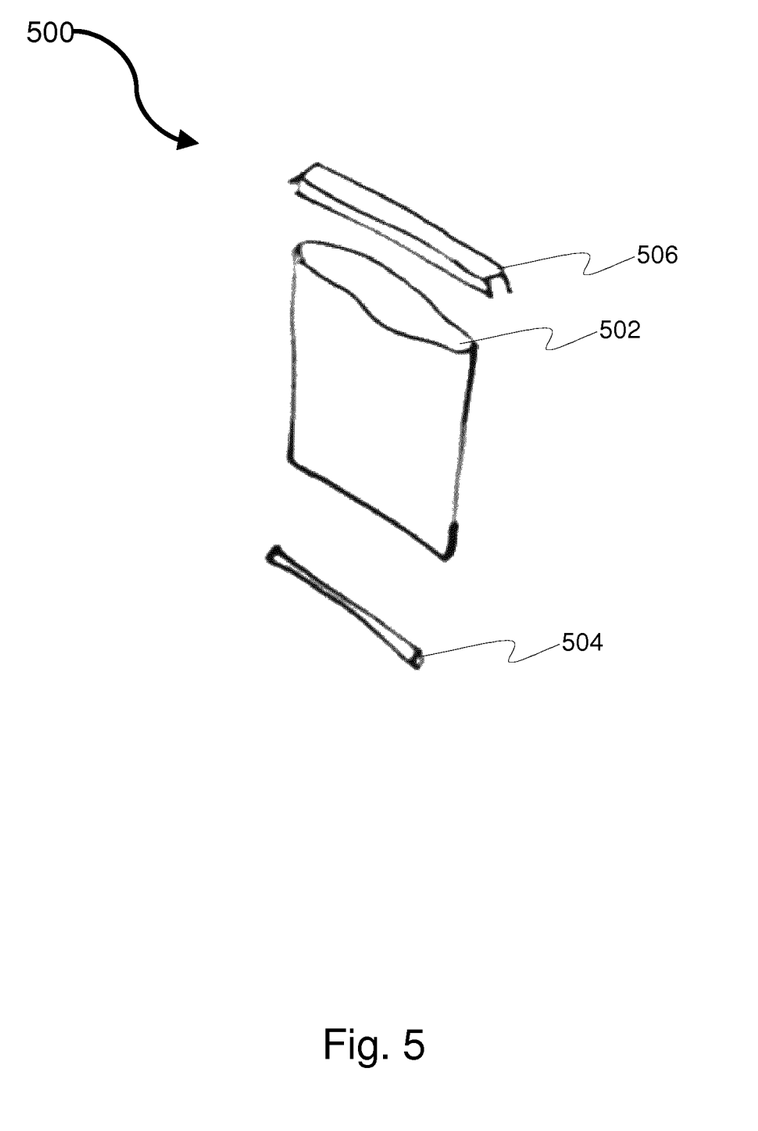
FIG. 5 is a schematic illustration of an example flexible vessel for use with cooking systems in accordance with embodiments of the present disclosure.

Flexible vessel 500 may be constructed from any of a variety of materials impervious to liquids such as, for example, silicone. In an example, the flexible vessel 500, may be formed from a semi-transparent or transparent material. Being easy to use, clean and re-use, flexible vessel 500 does not necessitate cooking food in plastic, and does not proliferate plastic waste.

Walls of flexible vessel 500 are constructed of a suitable thickness, for example, such as ranging from 0.25 mm to 0.75 mm to allow the flexible vessel to conform to a shape of a cooking subject held therein, when the flexible vessel is submerged in water or another cooking fluid filled in the cooking chamber 202.

The flexible vessel may exhibit a weight distribution that maintains opening 502 above the rest of flexible vessel 500, when partially or wholly submerged in the liquid filled in the cooking chamber 202 during operation. The weight distribution may be achieved by attaching a weight bar 504 to a bottom and/or sides of flexible vessel 500. Weight bar 504 may, for example, be made of a metal, such as steel or stainless steel. The weight distribution ensures that a total density of the flexible vessel and the cooking subject held therein is higher than a density of the fluid filled in the cooking chamber 202, even when some residual air might be trapped inside a submerged portion of flexible vessel 500.

Moreover, flexible vessel 500 may be constructed such that the exterior hydrostatic pressure closes the opening of the flexible vessel above the cooking subject held therein, when the flexible vessel is fully submerged.

In an example, flexible vessel 500 includes a zipper closure 506 provided to selectively seal the opening. Zipper closure 506 may, for example, be made of a suitable plastic. In another example, flexible vessel 500 includes a one-way valve to seal the opening.

In some examples, the cooking chamber 202 and the supportive base 204 have following dimensions: a width ranging from 120 mm to 300 mm, a length ranging from 120 mm to 300 mm, and a height ranging from 100 mm to 300 mm. Accordingly, the flexible vessel optionally has following dimensions: a width ranging from 120 mm to 300 mm, and a height ranging from 100 mm to 300 mm.

Moreover, the height of the cooking chamber 202 may be greater than the width of the cooking chamber 202. In one example, the height of the cooking chamber 202 is approximately twice the width of the cooking chamber 202.

In an illustrative example cooking device 108 is installed at a residence of the user. The user puts a cooking subject into the flexible vessel, and places the flexible vessel in the cooking chamber 202. Based on a change in mass detected by the scale 210, the cooking control module 212 sends a signal to the server 102. The server 102 then sends a notification to the remote client interface of the user device 106, for example, asking the user whether he/she wishes to cook.

If the user confirms that he/she wishes to cook, the server 102 may request the user provide one or more cooking parameters. These cooking parameters may, for example, include at least one of:
(i) details of the cooking subject he/she wishes to cook;
(ii) details of how he/she wishes the cooking subject to be cooked;
(iii) a cooking temperature;
(iv) a cooking duration;
(v) a time and/or date by when he/she wishes cooking to be complete; and/or
(vi) a time and/or date when he/she wishes the cooking to be started.

In an example, the details of the cooking subject may, for example, include a type of food, such as vegetables, fruits, seafood, fish, poultry, and meat. The details of how the user wishes the cooking subject to be cooked may, for example, pertain to an extent or doneness to which the user wishes the cooking subject to be cooked. In an example, the extent or doneness to which the user wishes a piece of meat to be cooked may include gradations, such as medium rare, medium, medium well, well done and so on.

It is to be noted here that the cooking system 100 allows the user to provide the cooking parameters remotely via the remote client interface, for example, when he/she is far away from his/her residence. In some examples, the cooking parameters are provided by selecting from a plurality of pre-set cooking recipes and/or previous cooking preferences.

Moreover, in some examples, the cooking system 100 allows the user to provide the cooking parameters in a natural language, wherein the server 102 is operable to interpret the cooking parameters using natural language processing techniques. As an example, the user may provide "fillet steak, medium rare, ready at dinner time" as an input for the cooking parameters.

If the user places the flexible vessel in the cooking chamber 202 at approximately 8 AM in morning, and wishes the cooking subject to be cooked by 7 PM, the server 102 generates a cooking control routine that is optimally suited to user's preferences of the cooking parameters, for example, in accordance with information contained in the cooking services database 104. The server 102 then sends the cooking control routine to the cooking control module 212, which then controls the cooking device 108 as per the cooking control routine. In some examples, the server 102 sends the cooking control routine to the remote client interface of the user device 106, whereupon the user approves the cooking control routine to be sent to the cooking control module 212.

Moreover, the cooking control routine may be generated based on a user input received from the remote client interface and/or his or her previous cooking preferences stored in the cooking services database 104. The cooking control routine may include a cooking temperature and time curve indicative of one or more desired chamber temperatures at one or more desired times.

If the cooking control routine specifies that the cooking subject be cooked for two hours at 57 degrees Centigrade (57° C.), the cooking control module 212 accordingly activates the cooling module 206 to cool down the cooking chamber 202 to a desired refrigeration temperature. This enables the cooking device 108 to keep the cooking subject inside the cooking chamber 202 safe for consumption for a same duration as a conventional refrigerator.

The desired refrigeration temperature may, for example, range from zero degrees Centigrade (0° C.) to seven degrees Centigrade (7° C.); more optionally, from two degrees Centigrade (2° C.) to five degrees Centigrade (5° C.).

Moreover, the desired refrigeration temperature may be either user-defined or system-defined by default. Cooking system 100 may allow the user to define the desired refrigeration temperature, for example, via the remote client interface of the user device 106 or a user interface of the cooking device 108. The cooking services database 104 may store the desired refrigeration temperature for the cooking device 108. Additionally or alternatively, the cooking control module 212 stores the desired refrigeration temperature locally.

Furthermore, the cooking control module 212 regulates the cooling module 206 to maintain the cooking chamber 202 at the desired refrigeration temperature, as per the cooking control routine. The cooking control module 212 then deactivates the cooling module 206 and activates the heating module 208 to heat the cooking chamber 202 and a flexible vessel submerged therein without the need to remove the flexible vessel and cooking subject from the cooking chamber. Thus, the cooking chamber 202 may be heated to a desired cooking temperature slightly before 5 PM in evening, for example, at 4:45 PM.

The cooking control module 212 then regulates the heating module 208 to maintain the cooking chamber 202 at the desired cooking temperature for the desired duration, namely, at 57 degrees Centigrade (57° C.) for two hours. As a result, the cooking is completed by 7 PM, as the user desired.

Moreover, the server 102 may keep a track of the time the cooking subject spends at each temperature, and analyzes the cooking control routine to verify food safety.

Moreover, the cooking system 100 allows the user to provide his or her feedback on how suited to his or her taste the cooking subject was cooked. The feedback is then stored at the cooking services database 104, for example, to be incorporated during cooking of similar cooking subjects in future.

In an additional example situation the user changes is or her plans for dinner, and sends a change request to the cooking system 100 to delay the cooking to the following day. If the user sent the request well in advance, for example, before 5 PM the server 102 generates a new cooking control routine in order to accommodate the request, and sends the new cooking control routine to the cooking control module 212.

If the user sent the change request quite late after the cooking started, for example, at 6 PM the server 102 modifies the cooking control routine slightly, by adding a cooling phase after the cooking is completed. For example, after the cooking is completed at 7 PM as per the original cooking control routine, the cooking control module 212 activates the cooling module 206 to cool down the cooking chamber 202 to the desired refrigeration temperature. This enables the cooking device 108 to keep the already cooked cooking subject inside the cooking chamber 202 safe for consumption for a same duration as a conventional refrigerator.

Moreover, the server 102 may provide other network-based features to the remote client interface, for example, such as a "recommend a side dish" feature. The "recommend a side dish" feature allows the user to browse through a list of suggestions for a side dish.

Moreover, the cooking system 100 may allow the user to keep a check on a status of the cooking at any given time. In an example, the status of the cooking may be provided by way of one or more of: the desired cooking temperature, an actual temperature of the cooking chamber 202, a time elapsed, and/or a time left.

In some examples, notifications regarding the status of the cooking may be sent to the remote client interface from time to time. In other examples, the notifications may be sent upon receiving a request from the user.

In this manner, the cooking system 100 allows the user to perform one or more of: (i) setting a cooking temperature and/or a cooking duration;
(ii) selecting from the plurality of pre-set cooking recipes and/or the previous cooking preferences;
(iii) checking a cooking control routine generated by the server 102;
(iv) checking the status of the cooking at any given time;
(v) modifying cooking parameters, when required; and/or
(vi) interacting with the other network-based features provided by the server 102.

FIGS. 2A-C are merely examples, which should not unduly limit the scope of the claims herein. A person skilled in the art will recognize many variations, alternatives, and modifications of embodiments of the present disclosure.

Figure 3:
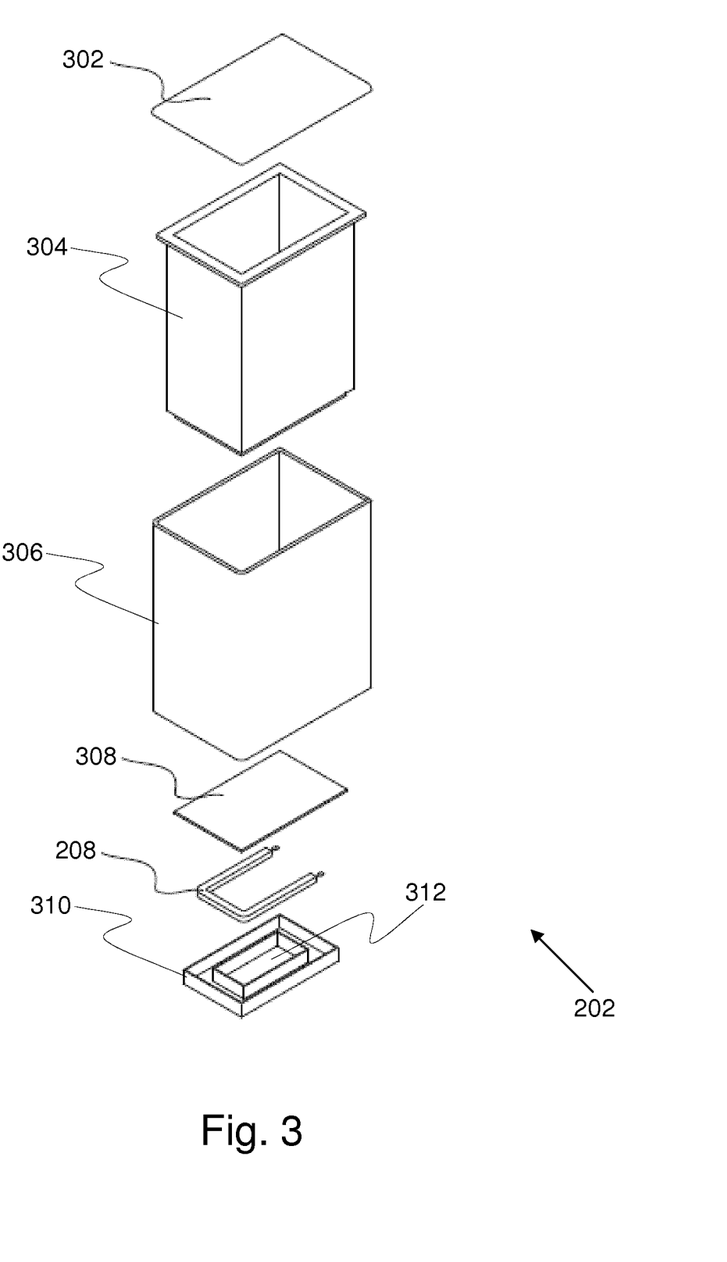
FIG. 3 is a schematic illustration of an example cooking chamber and various components associated therewith, in accordance with an embodiment of the present disclosure.

FIG. 3 is a schematic illustration of the cooking chamber 202 and various components associated therewith, in accordance with an embodiment of the present disclosure. FIG. 3 shows an exploded view of the cooking chamber 202 and the various components.

The cooking chamber 202 includes a lid 302 and a water bath having an inner wall 304 and an outer wall 306. The cooking chamber 202 further includes a contact plate 308 and a bottom plate 310.

The lid 302 and the water bath may be made from a substantially transparent material, for example, such as glass, polycarbonate, styrene acrylonitrile resin (SAN), acrylonitrile butadiene styrene (ABS), and other plastics. In some examples, the lid 302 is made of a flexible material, for example, such as silicone and plastic. Alternatively, the lid 302 and the water bath are made of a substantially opaque material, for example, such as a metal or a metal alloy.

The inner wall 304 and the outer wall 306 of the water bath provide the insulation from the ambient environment. It is to be noted here that the water bath can alternatively have a single wall.

When assembled, the inner wall 304 and the outer wall 306 may be connected using a wall connector, for example, made of a cork composite material or a Ultra-Violet (UV) curable adhesive. Additionally or alternatively, the inner wall 304 and the outer wall 306 may be connected using a suitable welding process, such as ultrasonic welding.

Moreover, the cooking chamber 202 may exhibit any of a variety of dimensions including but not limited to tall and slim with a small footprint. As such, the cooking chamber 202 may maintain one or more flexible vessels in an upright position, when partially or wholly submerged in the liquid filled in the water bath. This potentially prevents the liquid from entering these flexible vessels, and facilitates organization of the flexible vessels obviating any need for a holding rack. Furthermore, the small footprint facilitates cooling with a smaller cooling module.

A tall and slim cooking chamber 202 also allows a lesser amount of liquid, and consequently, lesser electrical power to cook a same amount of food, as compared to conventional "sous-vide" cooking systems.

Moreover, the inner wall 304 may be shaped in a vertically waved or slotted pattern, in a manner that the inner wall 304 is capable of supporting multiple flexible vessels upright. The vertically waved or slotted pattern is potentially useful in promoting circulation of the liquid in proximities of the inner wall 304, thereby preventing formation of hotter or colder regions within the water bath.

The water bath is mounted on the contact plate 308, which provides thermal contacts to the cooling module 206, the heating module 208 and one or more of the temperature sensors. For this purpose, a layer of a thermal interface material may be provided to a bottom surface of the contact plate 308.

One or more of: the cooling module 206, the heating module 208 and/or one or more of the temperature sensors are placed between the contact plate 308 and the bottom plate 310.

With reference to FIG. 3, the heating module 208 is substantially U-shaped, and is placed within a substantially rectangular slot provided in the bottom plate 310.

Moreover, the bottom plate 310 may include an opening 312 through which the cooling module 206 passes, so as to be in a thermal contact with the contact plate 308. For this purpose, the opening 312 and the cooling module 206 are designed in such a manner that a shape and size of the opening 312 substantially complements a shape and size of the cooling module 206, as shown in FIGS. 2C and 3.

The contact plate 308 and the bottom plate 310 are beneficially made of a metal or a metal alloy, for example, such as Aluminium, an Aluminium alloy, steel, and stainless steel.

FIG. 3 is merely an example, which should not unduly limit the scope of the claims herein. A person skilled in the art will recognize many variations, alternatives, and modifications of embodiments of the present disclosure.

Figure 4A:
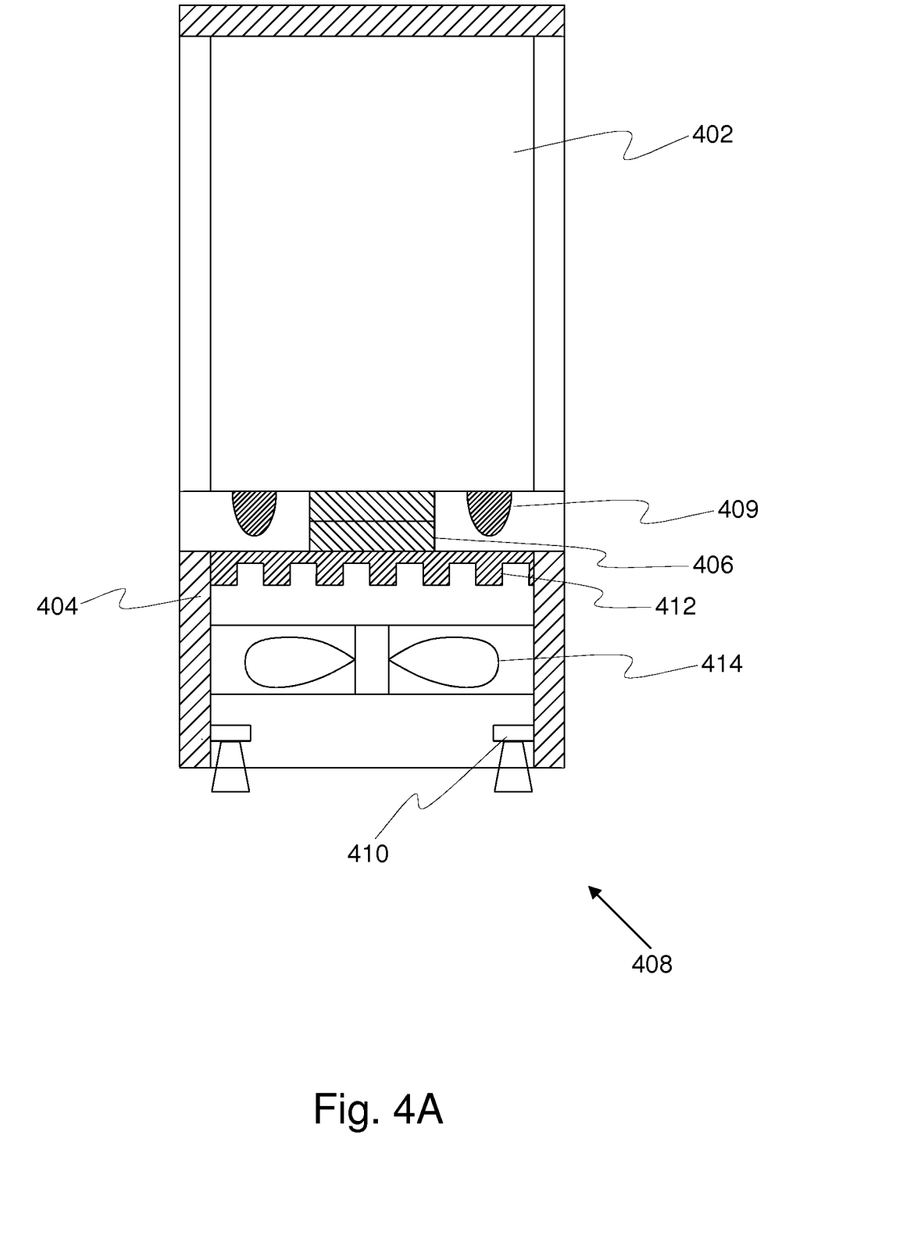
FIGS. 4A and 4B are schematic illustrations of an example cooking device, in accordance with an alternative embodiment of the present disclosure.
Figure 4B:
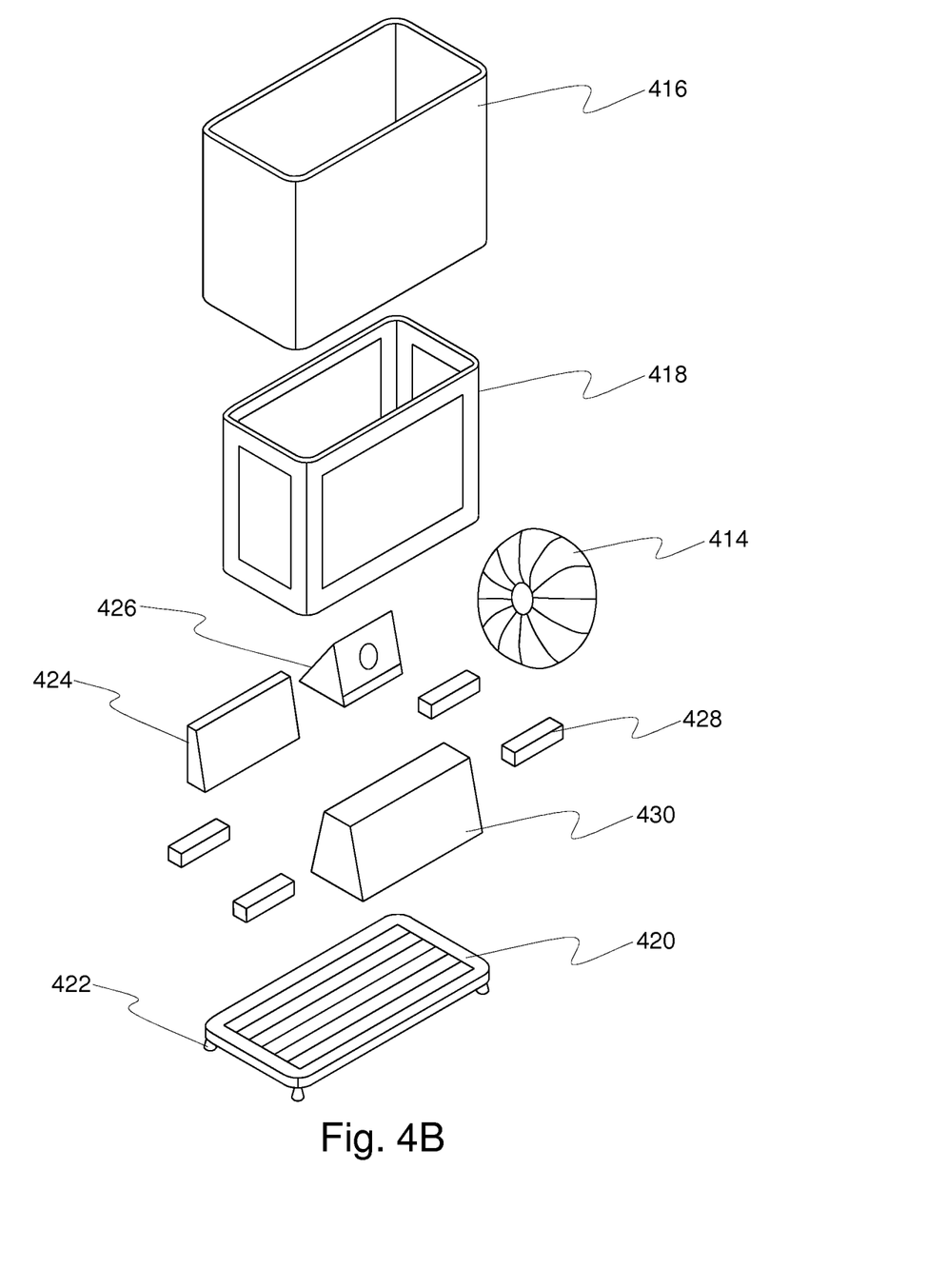

FIGS. 4A and 4B are schematic illustrations of the cooking device 408, in accordance with an alternative embodiment of the present disclosure; description of features in FIGS. 2A-C pertains mutatis mutandis to FIGS. 4A-B, except where stated otherwise.

FIG. 4A shows a cross-sectional view of the cooking device 408. The cooking device 408 includes a cooking chamber 402, a supportive base 404, a cooling module 406, a heating module 409, one or more temperature sensors (not shown), and a scale 410. The cooking device 408 may include a heat sink 412 and one or more fans, depicted as a fan 414 in FIG. 4A.

FIG. 4B shows an exploded view of the supportive base 404 and various components associated therewith.

The supportive base 404 includes an outer frame 416, an inner frame 418, and a base plate 420 with feet 422.

The supportive base 404 holds electrical components including the fan 414, a cooking control module 424, an air pump 426, four load cells 428 and a power supply 430.

As described earlier, the load cells 428 may be mounted in a half-bridge configuration on the feet 422 of the base plate 420. It is to be noted here that any number of load cells may be used.

In order to provide electrical insulation from the electrical components, the outer frame 416 may be made from an electrically-insulating material, for example, such as rubber, plastic, and polycarbonate. In order to provide strength to the supportive base 404, the inner frame 418 may be formed from a metal or a metal alloy, such as a perforated Aluminium sheet. Moreover, in order to provide both electrical insulation and strength, the base plate 420 may be made from a plastic, while the feet 422 may be made from rubber.

FIGS. 4A-B are merely examples, which should not unduly limit the scope of the claims herein. A person skilled in the art will recognize many variations, alternatives, and modifications of embodiments of the present disclosure. It is to be noted here that in alternative implementations, the air pump 426 may be replaced with a water pump or an impeller to produce a mechanical agitation within a liquid filled in the cooking chamber 402.

Embodiments of the present disclosure are susceptible to being used for various purposes, including, though not limited to, facilitating easy and safe "sous-vide" cooking of food; and enabling users to control and monitor their cooking devices remotely.

Modifications to embodiments of the present disclosure described in the foregoing are possible without departing from the scope of the present disclosure as defined by the accompanying claims. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A cooking system, comprising:
   a cooking chamber having side and bottom exterior surfaces;
   a supportive base constructed to removably receive the cooking chamber;
   a cooling module selectively supporting the cooking chamber and selectively directly contacting the bottom exterior surface of the cooking chamber to selectively reduce temperature of a fluid held therein;
   a heating module thermally coupled with the cooking chamber to selectively increase temperature of a fluid held therein;
   a temperature sensor thermally coupled with the cooking chamber to measure temperature in a fluid held therein;
   a one-way valve in fluid communication with the cooking chamber;
   an air pump configured to supply air through the one-way valve to the cooking chamber;
   a cooking control module arranged to adjust fluid flow through the one-way valve, and to adjust, through the cooling module and the heating module, temperature of a fluid held in the cooking chamber;
   a bag including an opening, the bag being sized and dimensioned to fit within the cooking chamber and constructed from a material impervious to liquids; and
   a plurality of load cells coupled with the cooking control module, wherein the cooking system is configured to switch on in response to determination by a server that detection of changes in mass and/or force by the plurality of load cells pertain to a tapping gesture; and
   wherein the cooking control module is programmed to activate the air pump in accordance with signals received from a remote interface.

2. The cooking system as set forth in claim 1, further comprising a heat sink thermally coupled with the cooling module opposite the cooking chamber to dissipate heat from the cooling module.

3. The cooking system as set forth in claim 1, wherein the heating module is a resistance heater.

4. The cooking system as set forth in claim 1, wherein the cooking control module is programmed to activate the heating module when a desired temperature is greater than both an ambient temperature and a temperature measured by the temperature sensor.

5. The cooking system as set forth in claim 1, wherein the cooking control module is programmed to activate the cooling module when a desired temperature is less than both an ambient temperature and a temperature measured by the temperature sensor.

6. The cooking system as set forth in claim 1, wherein the cooking control module is programmed to activate at least one of the heating module and the cooling module in accordance with signals received from the remote interface.

7. The cooking system as set forth in claim 1, wherein the bag includes a weight distribution maintaining the opening above a remainder of the bag when partially or wholly submerged.

8. The cooking system as set forth in claim 1, wherein the bag comprises a zipper closure provided to selectively seal the opening.

9. The cooking system as set forth in claim 1, wherein the bag comprises a one-way valve to seal the opening.

10. The cooking system as set forth in claim 1, wherein, in response to sufficient exterior hydrostatic pressure, the bag takes a form of a cooking subject held therein.

11. The cooking system as set forth in claim 1, further comprising one or more fans arranged to circulate air over one or more of: the heating module, the cooling module, the air pump.

\* \* \* \* \*